United States Patent Office 2,724,963
Patented Nov. 29, 1955

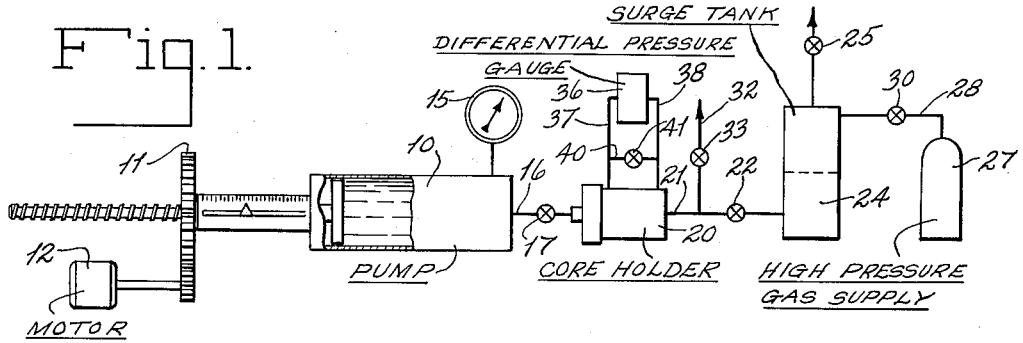

2,724,963

DETERMINATION OF EFFECTIVE NONWETTING PHASE PERMEABILITY

Karl C. ten Brink, Houston, Tex., assignor to The Texas Company, New York, N. Y., a corporation of Delaware Application June 2, 1951, Serial No. 229,640

7 Claims. (Cl. 73—38)

The present invention is concerned with the permeability of porous solid materials and, more particularly, the quantitative measurement of the effective permeability of porous, subsurface formation material with respect to a non-wetting phase fluid, under conditions simulating any desired degree of partial saturation by an accompanying wetting phase.

Accordingly, therefore, the determination reflects the effective permeability of the formation to a particular non-wetting fluid in a heterogeneous, wetting-non wetting fluid system, as for example, the permeability with respect to a non-wetting liquid hydrocarbon in the presence of capillary wetting phase of formation water.

In accordance with the present invention a liquid metal is injected into the porous solid material, under pressure to permeate the interior pores and occupy a predetermined proportion thereof under a condition of so-called, partial saturation. Thereafter the thus impregnated material is held under pressure to maintain the selected partial saturation while flow of the liquid metal is set up through the pores to enable quantative measurement of permeability to the flowing metal at that condition of partial saturation.

For example, a dry, clean and preferably evacuated core sample from a subsurface oil bearing reservoir is placed in contact with mercury under an elevated pressure effective to force the mercury to enter the internal pore space of the sample, while measured flow is maintained to reflect actual permeability. The proportion of the total available pore space occupied by the liquid metal is dependent upon the imposed pressure of the metal. Therefore, permeability can be determined at any desired degree of partial saturation, by operating at a corresponding overall pressure of liquid metal.

The term partial saturation as used herein, means the distribution of the liquid metal through the pores in a quantity less than the volume of the total internal pore space, and in a pattern of disposition determined by the capillary effect of the non-wetting liquid contacting the solid surfaces of the pores. The terms degree of or extent of partial saturation refer to the ratio of the thus injected liquid to the total available pore space.

Since the metallic liquid is non-wetting with respect to the dry surfaces of the porous formation sample, it enters the internal pore space in an amount dependent upon the pressure applied, and distributes itself therethrough in the same manner as the non-wetting phase in the case of an oil-water system within a water wet petroleum producing formation.

Conversely, the unoccupied or residual space of the sample corresponds to that occupied by, for example, the wetting phase of formation water, in such a system.

With the overall pressure maintained at the imposed value, the mercury is caused to flow through the sample under a slight pressure differential. As flow proceeds, the volume rate of flow (Q) is measured and recorded. This, together with the cross sectional area (A) and length (L) of the sample in the direction of flow therethrough and the pressure drop through the sample ($P_1$—$P_2$) give the essential facts necessary to the quantitative expression of effective permeability in accordance with Darcy's law as follows:

$$Q = \frac{kA(P_1 - P_2)}{uL}$$

where $k$ is the permeability in Darcys and $u$ is the viscosity of the flowing liquid.

As hereinafter shown in greater detail, the mercury flows readily at pressure differentials which are negligible with respect to the average overall imposed pressure necessary to effect the desired permeation of the sample. Therefore, any variation in the extent of saturation due to this pressure drop is likewise negligible and does not appreciably affect the results.

While mercury is one example of liquid which will distribute through a dry core sample in conformance to the space occupied by the non-wetting phase in a heterogeneous oil-water system, other liquid metals in general possess this critical function. Low melting metals such as mercury are, however, preferred from the standpoint that they are quite fluid, and are stable and inert with respect to most formations encountered in petroleum production, are readily available, and can be employed under ordinary atmospheric conditions and under normal temperatures at which the present determinations are most advantageously carried out. Therefore, it is preferred to employ metals which form homogeneous fluids at temperatures in the range of about 50–100° F. These include, in addition to mercury, the well-known class of low melting point metals of which the so called "Woods metal" is a typical example. The class of low melting metals usually comprises alloys of bismuth cadmium, tin and/or lead in various proportions, and frequently contains indium and/or mercury.

As above intimated the typical low viscosity of these metals is of particular advantage in the present process. Thus the viscosity of mercury is only about 1.5 centipoises at ordinary temperature. Therefore, a mercury flow rate adequate for precise permeability determination is usually maintainable through the sample at a pressure differential which is relatively low as compared with the overall imposed pressure. This means that the variation in absolute pressure of mercury through the sample as a result of flow is small and the variation in mercury saturation along the length of the sample is therefore correspondingly small. As a result, error due to variation in mercury saturation may be minimized.

The present invention is particularly advantageous in providing a practical method for measuring the "effective permeability" of a heterogeneous wetting and non-wetting fluid system in which the non-wetting phase, as above indicated, is characteristically disposed within a portion of the internal pore space. This is to be contrasted with determination of "specific permeability" in a simple, homogeneous, single phase flow system where the liquid completely saturates the pore volume, and where simple flow measurement under ordinary conditions suffices.

The measurement of effective permeability of the non-wetting phase in the heterogeneous fluid system is complicated by the presence of the discrete wetting phase which is mobile and therefore is displaced by the flow of non-wetting fluid. Thus the wetting phase of formation water which characteristically tends to occupy the smaller capillary spaces of the porous formation is disturbed by the flow of the non-wetting fluid phase and caused to redistribute through the sample in an unnatural manner. For example, at any substantial flow rate of the non-wetting phase liquid there is a decrease in wetting phase saturation at the inlet end of the sample and a quite radical increase at the outlet end of the sample. This seriously impairs the results of permeability determinations made in such a system.

Only at oil flow rates which are impractically low for routine measurement can this undesirable variation in oil saturation be avoided. Therefore, current methods with which I am familiar are either inaccurate or so complex and tedious as to be prohibitively costly for commercial use.

In sharp contrast, the present invention provides a simple and direct, routine process which, due to only negligible variation in partial saturation throughout the sample, accurately reflects effective permeability of porous hydrophilic formations with respect to non-wetting phase liquids, with due allowance for and simulation of an accompanying wetting phase, such as connate, capillary formation water. This information is of manifest value in connection with underground petroleum reservoir evaluation and production.

The present invention may be carried out in the apparatus disclosed more or less diagrammatically in the accompanying drawing wherein Figure 1 is a schematic flow sheet of the system and Figure 2 is a sectional view of the sample chamber or core holder employed therein.

Referring to Figure 1 of the drawing, the numeral 10 represents a positive displacement mercury volumetric pump calibrated to register the quantity of mercury displaced. The pump is driven through a gear train 11 by a motor 12. Advantageously the pump motor is of the adjustable-constant speed drive type to permit continual displacement of mercury at any selected rate of flow. Gage 15 indicates the pressure of mercury at the pump discharge. The mercury flows from pump 10 through pipe 16 controlled by valve 17 to core holder 20, which contains the porous sample. The outlet of the core holder connects by means of conduit 21 and valve 22 with surge tank 24 provided with adjustable pressure release valve 25.

In order to maintain the core holder under a high overall pressure during the test, means are provided for setting up a substantial back pressure in surge tank 24. These comprise a high pressure gas source 27, and, for example, may be a high pressure nitrogen cylinder, connecting through conduit 28 and regulating valve 30 with the surge tank 24 above liquid level therein.

Branch pipe 32, controlled by valve 33, extends from pipe 21 to a vacuum pump not shown to permit evacuation of the core sample prior to test.

The reference numeral 36 signifies a differential pressure gage connecting with the inlet and outlet of the core holder through pipes 37 and 38 respectively. The differential pressure gage therefore registers the pressure drop through the porous core sample during flow.

A by-pass line 40 controlled by valve 41 connects the conduits 37 and 38 and enables the regulated partial saturation of the core with mercury prior to institution of flow through the core.

Figure 2 illustrates the mounting of the sample 44 for test. The core is a typical cylindrical sample cut from a subsurface petroleum producing formation and mounted in a plastic sleeve 45 and a mounting cylinder 46 which is clamped within the core holder 20 by means of a ring 47. The opposite axial extremities of the core communicate respectively with outlet chamber 48 and inlet chamber 49 in the core holder. A cover 50 is gasketed in place at the inlet end of the holder by means of a bayonet type cap 51 provided with clamping screws 52.

In operation the core is first evacuated with valves 33, 41 and 17 opened and valve 22 closed. Thereafter, the mercury pump is set in operation to flood the chamber on both sides of the core sample with mercury at atmospheric pressure. From this point on the pump gradually builds up pressure, ultimately reaching a level where it commences to positively force the mercury into the internal pore space of the core. The actual amount of mercury thus injected into the core is directly readable from the calibrated pump and is the volume increment of mercury discharged by the pump after the initial and complete flooding of the core holder with mercury.

After the injection of the mercury into the core to the desired extent of partial saturation, the surge tank is pressured with gas from source 27 to approximately the pressure previously imposed upon the mercury. Then valve 22 is opened, by-pass valve 41 closed and the pump 10 operated to cause mercury to flow at a constant rate through pipe 16, into the inlet of the core holder. Therefore, the flow continues axially through the sample core and into the surge tank at the desired rate.

As above shown, the permeability of the core sample to the mercury flow is directly evident from the observed rate of mercury flow delivered by pump 10, the differential pressure as indicated by gage 36, the viscosity of the mercury and the cross sectional area and length of the path of flow through the core 44.

The degree of partial saturation of the core by the mercury is manifestly evident from the quantity of mercury injected and the total internal pore space of the sample previously determined by any conventional method.

Obviously, some pressure differential is necessary along the length of the core sample to effect the flow, but as above indicated, this is advantageously maintained at an insignificant value with respect to the high absolute average pressure maintained upon the core sample by the back pressure in surge tank 24.

The exceptional simplicity of the present process in the routine determination of effective permeability under successively different degrees of partial saturation is strikingly illustrated by the following sequence of steps. After first determining permeability as above at a relatively low degree of partial saturation, valve 22 is closed, valve 41 is opened, and the overall pressure on the core sample is gradually increased to cause the injection of an additional predetermined volume of mercury. Thereafter, the back pressure is correspondingly adjusted, valve 41 closed, valve 22 opened, and flow again instituted to determine the permeability under the new conditions of partial saturation.

This procedure may be repeated throughout the entire range of partial saturation as desired to give the complete characteristics of the core sample in regard to effective permeability of non-wetting liquid. In short, by maintaining a high fixed mercury pressure on the sample and applying a relatively small differential pressure along the sample, the mercury is made to flow readily with only an insignificant variation in the partial saturation throughout the length of the sample.

Instead of determining the amount of mercury forced into the core prior to each flow determination, a mercury capillary pressure curve may first be run by conventional methods to give the mercury injection pressure corresponding to each desired condition of partial saturation of the core. The mercury is then displaced from the core by distillation and the flow conditions determined as above at each of the absolute pressures corresponding to each of the desired core saturations at which permeability is desired.

It is contemplated, of course, making the usual routine test corrections required by the physical operations involved, for example, corrections for the effect of temperature, the effect of pressure on the volume of mercury, and the like.

Obviously, many modifications and variations of the invention as hereinbefore set forth may be made without departing from the spirit and scope thereof; and, therefore, only such limitations should be imposed as are indicated in the appended claims.

I claim:

1. The method of determining the permeability of porous solid materials to a non-wetting liquid partially saturating the internal pore space of the porous solid in a manner simulating a non-wetting fluid of a heterogeneous wetting-non-wetting fluid system, comprising injecting said porous solid with a fluent liquid metal under an elevated pressure effective to force through the porous solid against the capillary pressure thereof a quantity of said liquid metal corresponding to a predetermined partial saturation of the total internal pore space, applying said pressure at substantially the same elevated level at all points, within the porous solid to maintain the said predetermined partial saturation thereof substantially uniform throughout, setting up a flow of said liquid metal through the porous solid by creating between opposed surfaces thereof a pressure differential relatively small with respect to the said elevated pressure applied to said solid, and measuring the flow characteristics of said liquid metal to establish permeability of the porous material thereto at the predetermined conditions of partial saturation.

2. The method according to claim 1 wherein said liquid metal comprises a metal liquid at ordinary temperatures.

3. The method according to claim 1 wherein said liquid metal comprises mercury.

4. The method according to claim 1 wherein the said flow of liquid metal is effected under a pressure drop which is small relative to the overall pressure of liquid metal imposed such that the variation in partial saturation of the porous solid by liquid metal is negligible throughout the path of the flow.

5. The method of determining the permeability of porous solid material to non-wetting liquids partially saturating the internal pore space thereof in a manner simulating a heterogeneous wetting-non-wetting fluid system comprising, subjecting the porous solid material to a reduced pressure to evacuate the same, partially saturating the internal pore space of the porous solid with a fluent liquid metal by injection of the metal under an elevated pressure effective to cause the desired permeation against the capillary pressure thereof, maintaining said pressure of liquid metal substantially uniform at all points throughout the porous solid to effect a substantially uniform saturation of said internal pore space by said liquid metal, inducing flow of said metal through the porous solid by setting up a pressure differential relatively small with regard to the total pressure on the solid and measuring the flow characteristics of said liquid metal flowing through said porous solid to establish permeability of the porous material to the liquid material at the prevailing condition of partial saturation.

6. The method of determining the effective permeability of a porous solid material to a liquid which is non-wetting with respect to the surfaces of said solid material and which occupies the internal pore space thereof in a condition of partial saturation simulating the disposition of a non-wetting liquid in a heterogeneous, multi-phase, wetting-non-wetting fluid system, which comprises mounting a sample of said porous solid material for passage of fluid therethrough between opposed surfaces, contacting said opposed surfaces with a fluent liquid metal, imposing upon said liquid metal an elevated pressure sufficient to effect uniform injection thereof throughout the internal pore space of said sample against the capillary pressure thereof, maintaining said imposed pressure substantially uniform throughout the sample to effect a predetermined partial saturation of said pore space, creating between said opposed surfaces a pressure differential relatively small with respect to the imposed pressure, thereby causing flow of said metal through the porous solid and measuring the flow characteristics of said flowing liquid metal passing through said sample to determine permeability to said liquid metal at said condition of partial saturation.

7. The method of determining the effective permeability of a porous solid material to a liquid which is non-wetting with respect to the surfaces of said solid material and which occupies the internal pore space thereof in a condition of partial saturation simulating the disposition of a non-wetting liquid in a heterogeneous, multi-phase, wetting-non-wetting fluid system which comprises subjecting a sample of said porous solid material to contact with a non-wetting liquid metal at a relatively elevated pressure so as to partially saturate said sample of porous material with said liquid metal to a predetermined extent, maintaining said liquid metal in contact with said sample at said elevated pressure and flowing through said porous sample a flow of said liquid metal at a differential pressure relatively small with respect to said elevated pressure.

References Cited in the file of this patent

UNITED STATES PATENTS

| | | |
|---|---|---|
| 2,293,488 | Bays | Aug. 18, 1942 |
| 2,327,642 | Horner | Aug. 24, 1943 |
| 2,345,935 | Hassler | Apr. 4, 1944 |
| 2,604,779 | Purcell | July 29, 1952 |
| 2,641,924 | Reichertz | June 6, 1953 |
| 2,693,104 | Welge et al. | Nov. 2, 1954 |